(12) United States Patent
Koch et al.

(10) Patent No.: US 10,366,433 B2
(45) Date of Patent: Jul. 30, 2019

(54) METHODS AND SYSTEMS FOR USAGE BASED CONTENT SEARCH RESULTS

(71) Applicant: Adobe Inc., San Jose, CA (US)

(72) Inventors: Zeke Koch, San Francisco, CA (US); Baldo Faieta, San Francisco, CA (US); Jen-Chan Chien, Saratoga, CA (US); Mark M. Randall, Folsom, CA (US); Olivier Sirven, Paris (FR); Philipp Koch, Park City, UT (US); Dennis G. Nicholson, Atherton, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 14/827,836

(22) Filed: Aug. 17, 2015

(65) Prior Publication Data
US 2017/0053189 A1  Feb. 23, 2017

(51) Int. Cl.
*G06Q 30/00* (2012.01)
*G06Q 30/06* (2012.01)
*G06F 16/58* (2019.01)
*G06F 16/9538* (2019.01)
*G06F 16/953* (2019.01)
(Continued)

(52) U.S. Cl.
CPC ..... *G06Q 30/0625* (2013.01); *G06F 16/5866* (2019.01); *G06F 16/953* (2019.01); *G06F 16/9538* (2019.01); *G06Q 30/0623* (2013.01); *G06Q 30/0629* (2013.01); *H04N 21/2407* (2013.01); *H04N 21/44222* (2013.01); *H04N 21/4828* (2013.01); *H04N 21/632* (2013.01);
(Continued)

(58) Field of Classification Search
CPC . G06Q 30/0601–0645; G06Q 30/0623; G06Q 30/0625; G06Q 30/0629; G06F 16/5866; G06F 16/9538; G06F 16/953
USPC ............. 705/26.1–27.2, 26.61, 26.62, 26.64; 707/706, 722, 723, 727
See application file for complete search history.

(56) References Cited

U.S. PATENT DOCUMENTS

| 5,696,964 | A | 12/1997 | Cox et al. |
| 6,012,073 | A | 1/2000 | Arend et al. |

(Continued)

OTHER PUBLICATIONS

Trevisiol, Michele; Chiarandini, Luca; Miello, Luca Maria; Jaimes, Alejandro. Image Ranking Based on User Browsing Behavior. Conference Paper Aug. 2012. Uploaded by Michele Trevisiol on May 21, 2014. (Year: 2012).*

(Continued)

*Primary Examiner* — Jeffrey A. Smith
*Assistant Examiner* — Allison G Wood
(74) *Attorney, Agent, or Firm* — SBMC (57) ABSTRACT

Usage based content search result techniques are described. In one or more implementations, a digital medium environment controls image searches and availability by one or more computing devices. A search is performed by the one or more computing devices to locate images made available via a network by a content sharing service responsive to one or more inputs received from a user. A search result is configured by the one or more computing devices that includes the plurality of images based at least in part on an amount of usage of respective said images by other users of the content sharing service. Output of the search result is controlled via a user interface by the one or more computing devices to the user of the content sharing service.

20 Claims, 9 Drawing Sheets

(51) Int. Cl.
    *H04N 21/24*     (2011.01)
    *H04N 21/442*     (2011.01)
    *H04N 21/482*     (2011.01)
    *H04N 21/63*     (2011.01)
    *H04N 21/81*     (2011.01)
    *H04N 21/84*     (2011.01)

(52) U.S. Cl.
    CPC ......... *H04N 21/8153* (2013.01); *H04N 21/84* (2013.01)

(56) References Cited

U.S. PATENT DOCUMENTS

| | | | |
|---|---|---|---|
| 6,157,435 | A | 12/2000 | Slater et al. |
| 6,483,570 | B1 | 11/2002 | Slater |
| 6,574,616 | B1 | 6/2003 | Saghir |
| 6,629,104 | B1 | 9/2003 | Parulski et al. |
| 6,859,802 | B1 | 2/2005 | Rui |
| 6,873,327 | B1 | 3/2005 | Edwards et al. |
| 6,901,378 | B1 | 5/2005 | Linker et al. |
| 6,941,294 | B2 | 9/2005 | Flank |
| 7,047,413 | B2 | 5/2006 | Yacobi et al. |
| 7,113,921 | B2 | 9/2006 | Linker |
| 7,127,106 | B1 | 10/2006 | Neil et al. |
| 7,249,034 | B2 | 7/2007 | Schirmer |
| 7,286,723 | B2 | 10/2007 | Taugher et al. |
| 7,460,737 | B2 | 12/2008 | Shuster |
| 7,492,921 | B2 | 2/2009 | Foote et al. |
| 7,493,340 | B2 | 2/2009 | Rui |
| 7,523,102 | B2 | 4/2009 | Bjarnestam et al. |
| 7,574,378 | B2 | 8/2009 | Lipowitz et al. |
| 7,613,686 | B2 | 11/2009 | Rui |
| 7,689,620 | B2 | 3/2010 | Tan |
| 7,725,398 | B2 | 5/2010 | Dawson et al. |
| 7,783,624 | B2 | 8/2010 | Martinez et al. |
| 7,797,377 | B2 | 9/2010 | Linker et al. |
| 7,808,555 | B2 | 10/2010 | Aratani et al. |
| 7,818,261 | B2 | 10/2010 | Weiskoph et al. |
| 7,920,760 | B2 | 4/2011 | Yoda |
| 7,929,810 | B2 | 4/2011 | Shuster |
| 7,933,765 | B2 | 4/2011 | Summerlin et al. |
| 7,940,959 | B2 | 5/2011 | Rubenstein |
| 7,949,625 | B2 | 5/2011 | Brough et al. |
| 7,961,938 | B1 | 6/2011 | Remedios |
| 7,996,266 | B2 | 8/2011 | Gura |
| 8,041,612 | B1 | 10/2011 | Treyz |
| 8,073,828 | B2 | 12/2011 | Bowden et al. |
| 8,144,995 | B2 | 3/2012 | Thompson |
| 8,155,382 | B2 | 4/2012 | Rubenstein |
| 8,219,494 | B1 | 7/2012 | Pride et al. |
| 8,229,800 | B2 | 7/2012 | Trotman et al. |
| 8,285,082 | B2 | 10/2012 | Heck |
| 8,285,084 | B2 | 10/2012 | Yoda |
| 8,341,195 | B1 | 12/2012 | Cole et al. |
| 8,380,005 | B1 | 2/2013 | Jonsson |
| 8,396,331 | B2 | 3/2013 | Jia et al. |
| 8,412,568 | B2 | 4/2013 | Bastos et al. |
| 8,417,000 | B1 | 4/2013 | Mendis |
| 8,452,049 | B2 | 5/2013 | Rubenstein |
| 8,504,547 | B1* | 8/2013 | Yee ................... G06F 17/30268 707/706 |
| 8,515,139 | B1 | 8/2013 | Nechyba et al. |
| 8,560,455 | B1 | 10/2013 | Raman et al. |
| 8,571,329 | B2 | 10/2013 | Thompson |
| 8,582,872 | B1 | 11/2013 | Loffe et al. |
| 8,620,905 | B2 | 12/2013 | Ellsworth |
| 8,625,887 | B2 | 1/2014 | Li |
| 8,644,646 | B2 | 2/2014 | Heck |
| 8,688,586 | B2 | 4/2014 | Pride et al. |
| 8,699,826 | B2 | 4/2014 | Remedios |
| 8,774,529 | B2 | 7/2014 | Rubenstein et al. |
| 8,792,685 | B2 | 7/2014 | Sangster |
| 8,812,392 | B2 | 8/2014 | Shahghasemi |
| 8,831,998 | B1 | 9/2014 | Cramer et al. |
| 8,879,837 | B2 | 11/2014 | Usher |
| 8,898,171 | B2 | 11/2014 | Tan |
| 8,934,717 | B2 | 1/2015 | Newell et al. |
| 9,071,662 | B2 | 6/2015 | Svendsen et al. |
| 9,489,400 | B1 | 11/2016 | Haitani |
| 9,715,714 | B2 | 7/2017 | Koch et al. |
| 9,824,463 | B2 | 11/2017 | Ingrassia et al. |
| 9,858,244 | B1 | 1/2018 | Bjorkegren |
| 9,911,172 | B2 | 3/2018 | Koch et al. |
| 2002/0033844 | A1 | 3/2002 | Levy et al. |
| 2003/0151611 | A1 | 8/2003 | Turpin et al. |
| 2005/0010553 | A1 | 1/2005 | Liu |
| 2006/0204142 | A1* | 9/2006 | West ................... G06F 17/30864 382/305 |
| 2007/0097959 | A1 | 5/2007 | Taylor |
| 2007/0133947 | A1 | 6/2007 | Armitage et al. |
| 2007/0168513 | A1 | 7/2007 | Weiskopf et al. |
| 2007/0208670 | A1 | 9/2007 | Quoc |
| 2007/0297683 | A1 | 12/2007 | Luo et al. |
| 2009/0083236 | A1 | 3/2009 | Shuster |
| 2009/0160859 | A1 | 6/2009 | Horowitz |
| 2009/0287669 | A1 | 11/2009 | Bennett |
| 2010/0070342 | A1 | 3/2010 | Hu et al. |
| 2010/0306344 | A1 | 12/2010 | Athas et al. |
| 2011/0029408 | A1* | 2/2011 | Shusterman ...... G06F 17/30867 705/27.1 |
| 2011/0167059 | A1* | 7/2011 | Fallah ................... G06Q 30/08 707/723 |
| 2011/0270697 | A1 | 11/2011 | Sunkada |
| 2012/0120097 | A1 | 5/2012 | Sun et al. |
| 2012/0128239 | A1 | 5/2012 | Goswami et al. |
| 2012/0179673 | A1* | 7/2012 | Kelly ................ G06F 17/30528 707/731 |
| 2013/0019257 | A1 | 1/2013 | Tschernutter et al. |
| 2013/0080881 | A1 | 3/2013 | Goodspeed et al. |
| 2013/0117258 | A1 | 5/2013 | Linsley et al. |
| 2013/0167105 | A1 | 6/2013 | Goldman et al. |
| 2013/0215116 | A1 | 8/2013 | Siddique et al. |
| 2013/0335582 | A1 | 12/2013 | Itasaki et al. |
| 2014/0019264 | A1 | 1/2014 | Wachman et al. |
| 2014/0046792 | A1 | 2/2014 | Ganesan |
| 2014/0114962 | A1 | 4/2014 | Rosenburg et al. |
| 2014/0122283 | A1 | 5/2014 | Mehra et al. |
| 2014/0189525 | A1 | 7/2014 | Trevisiol et al. |
| 2014/0201227 | A1 | 7/2014 | Hamilton-Dick et al. |
| 2014/0245358 | A1 | 8/2014 | Kumar et al. |
| 2014/0289134 | A1 | 9/2014 | Sutton |
| 2014/0310264 | A1 | 10/2014 | D'Ambrosio |
| 2014/0324838 | A1 | 10/2014 | Sako et al. |
| 2014/0351021 | A1* | 11/2014 | Higbie ................ G06Q 30/0206 705/7.35 |
| 2014/0351284 | A1 | 11/2014 | Ikonomov |
| 2014/0365463 | A1 | 12/2014 | Tusk |
| 2015/0018094 | A1 | 1/2015 | Watari et al. |
| 2015/0106628 | A1 | 4/2015 | Holman et al. |
| 2015/0161258 | A1* | 6/2015 | Yee ................... G06F 17/30268 707/706 |
| 2015/0234864 | A1 | 8/2015 | Kruckemeier |
| 2015/0324394 | A1 | 11/2015 | Becker et al. |
| 2015/0347369 | A1 | 12/2015 | Babon et al. |
| 2015/0363503 | A1 | 12/2015 | Scheuerman |
| 2016/0035055 | A1 | 2/2016 | Perkins et al. |
| 2016/0180193 | A1 | 6/2016 | Masters |
| 2016/0196589 | A1 | 7/2016 | Subbarayan |
| 2016/0226984 | A1 | 8/2016 | Kelly et al. |
| 2016/0253707 | A1 | 9/2016 | Momin et al. |
| 2016/0314203 | A1 | 10/2016 | Wickenkamp |
| 2016/0370973 | A1 | 12/2016 | Morgan et al. |
| 2017/0034286 | A1 | 2/2017 | Kirschner |
| 2017/0052981 | A1 | 2/2017 | Koch et al. |
| 2017/0053103 | A1 | 2/2017 | Koch et al. |
| 2017/0053104 | A1 | 2/2017 | Koch et al. |
| 2017/0053332 | A1 | 2/2017 | Koch et al. |
| 2017/0053365 | A1 | 2/2017 | Koch et al. |

(56) References Cited

U.S. PATENT DOCUMENTS

2017/0053372 A1     2/2017   Koch et al.
2017/0221171 A1     8/2017   Koch et al.

OTHER PUBLICATIONS

"Pre-Interview Communication", U.S. Appl. No. 14/827,670, dated Feb. 17, 2017, 3 pages.
"Pre-Interview Communication", U.S. Appl. No. 14/827,974, dated Mar. 1, 2017, 3 pages.
"Pre-Interview Communication", U.S. Appl. No. 14/828,085, dated Feb. 28, 2017, 4 pages.
"Notice of Allowance", U.S. Appl. No. 14/827,974, dated Apr. 19, 2017, 7 pages.
"Supplemental Notice of Allowance", U.S. Appl. No. 15/491,943, dated Feb. 6, 2018, 2 pages.
"Final Office Action", U.S. Appl. No. 14/827,670, dated Feb. 1, 2018, 29 pages.
"Final Office Action", U.S. Appl. No. 14/828,085, dated Dec. 12, 2017, 29 pages.
"First Action Interview Office Action", U.S. Appl. No. 14/827,670, dated Aug. 29, 2017, 4 pages.
"First Action Interview Office Action", U.S. Appl. No. 14/828,085, dated Aug. 24, 2017, 4 pages.
"Notice of Allowance", U.S. Appl. No. 15/491,943, dated Oct. 24, 2017, 6 pages.
"Pre-Interview Communication", U.S. Appl. No. 15/491,943, dated Sep. 14, 2017, 3 pages.
"Final Office Action", U.S. Appl. No. 14/828,085, dated Jul. 20, 2018, 28 pages.
"Pre-Interview First Office Action", U.S. Appl. No. 14/827,600, dated Aug. 10, 2018, 3 pages.
"Restriction Requirement", U.S. Appl. No. 14/827,583, dated Jul. 19, 2019, 6 pages.
"Restriction Requirement", U.S. Appl. No. 14/827,645, dated Jun. 18, 2018, 6 pages.
"Non-Final Office Action", U.S. Appl. No. 14/828,085, dated Mar. 26, 2018, 29 pages.
"Examiner's Answer to Appeal Brief", U.S. Appl. No. 14/827,670, dated Nov. 28, 2018, 8 pages.
"First Action Interview Office Action", U.S. Appl. No. 14/827,600, dated Sep. 24, 2018, 3 pages.
"Non-Final Office Action", U.S. Appl. No. 14/827,645, dated Oct. 29, 2018, 12 pages.
"Pre-Interview First Office Action", U.S. Appl. No. 14/827,583, dated Oct. 5, 2018, 5 pages.
"Pre-Interview First Office Action", U.S. Appl. No. 14/827,645, dated Nov. 5, 2018, 3 pages.
"Non-Final Office Action", U.S. Appl. No. 14/828,085, Jun. 12, 2019, 25 pages.
"Final Office Action", U.S. Appl. No. 14/827,583, Mar. 8, 2019, 25 pages.
"Final Office Action", U.S. Appl. No. 14/827,600, Apr. 25, 2019, 10 pages.
"Final Office Action", U.S. Appl. No. 14/827,645, Mar. 13, 2019, 12 pages.
"Non-Final Office Action", U.S. Appl. No. 14/827,600, Apr. 22, 2019, 11 pages.

* cited by examiner

METHODS AND SYSTEMS FOR USAGE BASED CONTENT SEARCH RESULTS

BACKGROUND

Content sharing services have been developed as a technique to provide an online marketplace for creative professionals to sell content, such as images. A creative professional, for instance, may capture or create images that are exposed via the content sharing services to potential customers such as marketing professionals, casual users, and so on. For example, a creative professional may capture an image of a coworkers conversing next to a watercooler. The image is then uploaded and tagged for availability as part of the content sharing service such that a marketing professional performing a search for "office" and "watercooler" may locate the image. The content sharing service also includes functionality to make the image available for purchase or licensing in response to payment of a fee, e.g., as part of a subscription service, pay per use, and so forth.

In a digital online marketplace, however, search results may become stale very quickly by including items that although were once of interest to users are no longer of interest, e.g., an image of an outdated item such as an older mobile phone when images of newer phones are available.

SUMMARY

Usage based content search result techniques are described. In one or more implementations, a digital medium environment controls image searches and availability by one or more computing devices. A search is performed by the one or more computing devices to locate images made available via a network by a content sharing service responsive to one or more inputs received from a user. A search result is configured by the one or more computing devices that includes the plurality of images based at least in part on an amount of usage of respective said images by other users of the content sharing service. Output of the search result is controlled via a user interface by the one or more computing devices to the user of the content sharing service.

In one or more implementations, a system implements a content sharing service using one or more computing devices to make images available via a network for purchase or licensing. The content sharing service includes a search monitoring module implemented at least partially in hardware to perform searches initiated by users to locate images that are made available via a network by the content sharing service for use by the users and determine an age associated with images that are obtained by the users or an amount of usage of the images. The content sharing service also includes a content pricing module implemented at least partially in hardware to expose a price that is paid to obtain respective said images based on the determined age or the amount of usage.

In one or more implementations, a system implements a content sharing service using one or more computing devices to make images available via a network for purchase or licensing. The content sharing service is configured to perform operations including performing a plurality of searches of images made available via a network by the content sharing service responsive to a plurality of matching search requests originated by a plurality of users. The content sharing service also configures a plurality of search results that includes one or more images, based at least in part on an amount of usage of respective said images by other users of the content sharing service, such that a first one of the plurality of search results to be provided to a first said user includes at least one image that is different from a second one of the plurality of search results to be provided to a second said user. The content sharing service also controls output of the plurality of search results via the content sharing service.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Content sharing services are configured to unite content from creative professionals with consumers of the content, such as marketers. An example of this is the content sharing service Adobe Stock™ by Adobe®, via which images are made available, e.g., via licensing or for purchase, for users of the service. The images, for instance, may be made available as stock photos, including macro-stock images that are generally high-priced and exclusive, micro-stock which is relatively low priced and made available to wide range of consumers, and mid-stock which is priced between the two.

While serving as a valuable technique in which creative professional may be united with potential consumers, conventional content sharing services employ search techniques that may result in stale and/or oversaturation of images in a search result. In a digital environment, images are easily accessible, shareable, and can become quickly oversaturated in the marketplace, making them unattractive to prospective buyers. This can lead to an inability of content creators to get their new images seen by potential consumers as well as limit potential consumers in obtaining original and up-to-date content.

Usage based content search techniques and systems are described within a digital environment. In the following, a new usage parameter tracking system is implemented to optimize the value of images returned in an image search based on a usage level (e.g., "freshness" as defined herein) of content provided as part of a search result within the digital environment. In one example, a search result is configured to include images based at least in part on an amount of usage of the images by users of the service. Counterintuitively to systems that exhibit search results that are based on the most popular views, this includes an option to remove images that have exhibited relatively high levels of usage, add images that have not exhibited relatively high levels of usage, and other techniques to get these new images seen by potential consumers. In this way, the digital environment supports provision of images that are not stale or overused and are thus suitable for use in new ways, such as to obtain images for inclusion in a marketing campaign that are not user and/or not popularly used by other marketers or users and thus promote original content, further discussion of which is described in relation to FIGS. 2-4. This may also be used to vary the images provided in search results even in instances in which the search requests match. For example, different search results may be provided to users even though the search request includes matching keywords. In this way, a larger variety of images may be exposed to a potentially larger group of consumers and thereby promote uniqueness of the images, further discussion of which is described in relation to FIGS. 5 and 6. A variety of mechanisms are described to parameterize a usage level relative to the principles of the present invention.

Usage based content search techniques and systems are described. In the following, a new usage parameter tracking system is implemented to promote a "freshness" (as defined herein) of content provided by a content sharing service. In one example, a search result may be configured to include images based at least in part on an amount of usage of the images by users of the service. Counterintuitively to systems that exhibit search results that are based on the most popular views, this may include providing an option to remove images that have exhibited relatively high levels of usage, add images that have not, and so on such that the images are not stale or overused, further discussion of which is described in relation to FIGS. 2-4. A variety of mechanisms are described to parameterize a usage level relative to the principles of the present invention.

In a further example, pricing that is used to purchase or license use of content is based at least in part on the "freshness" of the content. This may include an amount of usage of the content, an age of the content, and so on. Thus, users may be granted access and corresponding prices to content of the content sharing service, additional description of which is included in the following in relation to FIGS. 7 and 8.

In the following discussion, an example environment is first described that is configured to employ the usage based content search techniques described herein. Example procedures are then described which may be performed in the example environment as well as other environments. Consequently, performance of the example procedures is not limited to the example environment and the example environment is not limited to performance of the example procedures.

Example Environment

Figure 1:
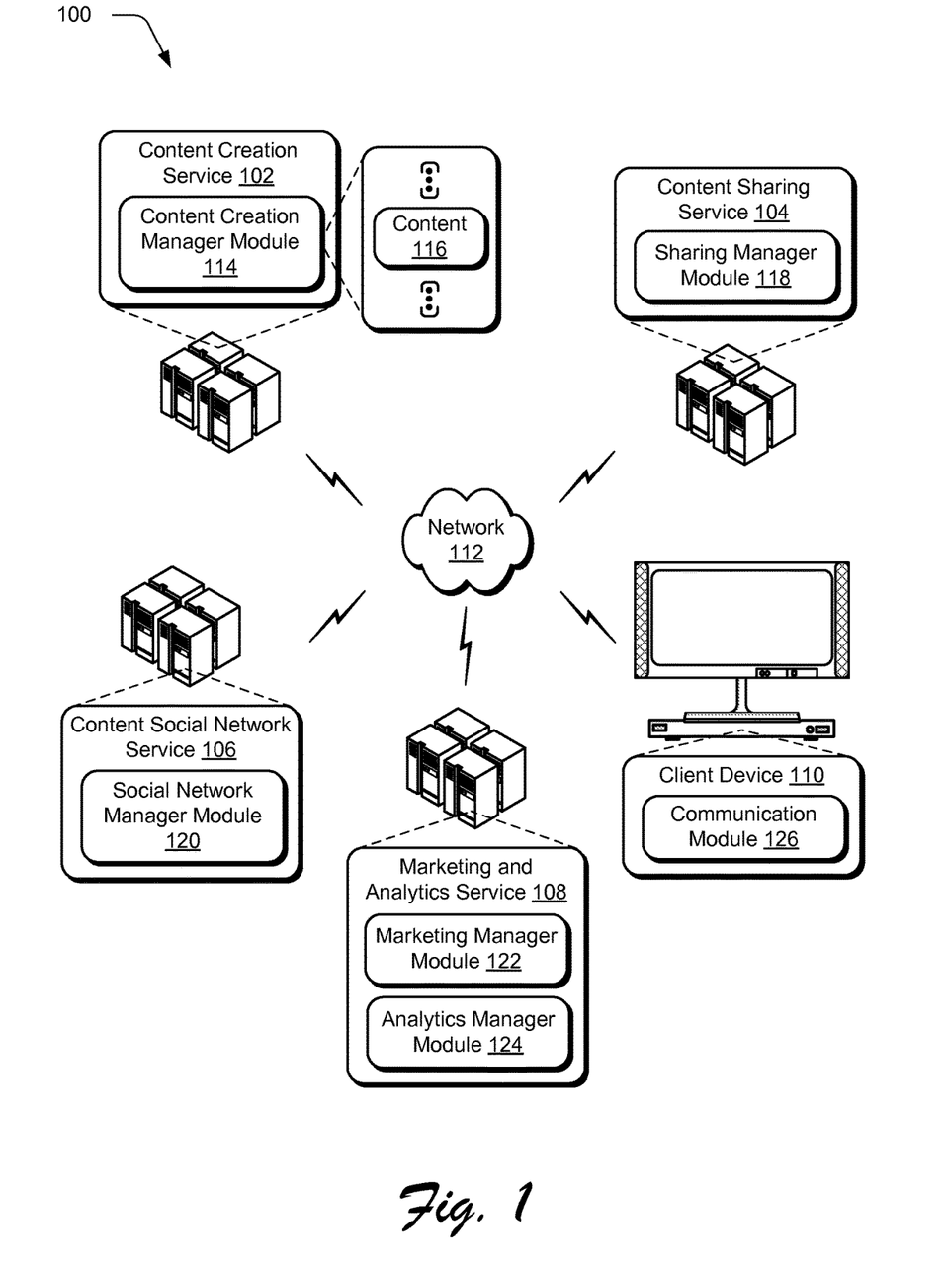
FIG. 1 is an illustration of an environment in an example implementation that is operable to employ content creation and deployment techniques described herein.

FIG. 1 is an illustration of an environment 100 in an example implementation that is operable to employ usage based content search techniques described herein. A digital medium environment is illustrated that is configured to perform searches for content that may leverage "freshness" of the content as expressed by an amount of usage or newness of the content. The illustrated environment 100 includes a content creation service 102, a content sharing service 104, a content social network service 106, a marketing and analytics service 108, and a client device 110 that are communicatively coupled, one to another, via a network 112. Although illustrated separately, functionality represented by the content creation service 102, the content sharing service 104, the content social network service 106, and the marketing and analytics service 108 are also combinable into a single entity, may be further divided across other entities that are communicatively coupled via the network 112, and so forth.

Computing devices that are used to implement the content creation service 102, the content sharing service 104, the content social network service 106, the marketing and analytics service 108, and the client device 110 are configurable in a variety of ways. Computing devices, in one such instance, are configured as a desktop computer, a laptop computer, a mobile device (e.g., assuming a handheld configuration such as a tablet or mobile phone), and so forth. Thus, computing devices range from full resource devices with substantial memory and processor resources (e.g., personal computers, game consoles) to a low-resource device with limited memory and/or processing resources (e.g., mobile devices). Additionally, although a single computing device is shown in some instances, computing devices are also representative of a plurality of different devices, such as multiple servers utilized by a business to perform operations "over the cloud" as shown for the content creation service 102, the content sharing service 104, the content social network service 106, the marketing and analytics service 108, further discussion of which may be found in relation to FIG. 9.

The content creation service 102 is illustrated as including a content creation manager module 114 that is representative of functionality that is available via the network 112 to create and store content 116. The content creation manager module 114 provides a variety of functionality that is related to the creation of content 116. Examples of this functionality include graphic design, video editing, web development, image creation and processing, sound data processing, photography, and so forth. For example, functionality supported by the content creation manager module 114 includes digital motion graphics and compositing applications, digital audio editors, GUI web development application, animation design, web design, multimedia authoring applications, application-authoring applications, a vector graphics editor, desktop publishing applications, webpage and web development applications, raster-graphics editing applications, a real-time timeline-based video editing application, and so forth.

The content sharing service 104 includes a sharing manager module 118. The sharing manager module 118 is representative of functionality to unite content of creative professionals with consumers of the content, such as marketers, via an online service. An example of this is the content sharing service Fotolia® by Adobe®, via which images are made available, e.g., via licensing, for users of the service. The images, for instance, may be made available as stock photos, including macro-stock images that are generally high-priced and exclusive, micro-stock which is relatively low priced and made available to wide range of consumers, and mid-stock which is priced between the two. Functionality of the sharing manager module 118 may include support of searches to locate desired images, pricing techniques, digital rights management (DRM), and generation of content creation suggestions, further discussion of which begins in relation to FIG. 2 in the following.

The content social network service 106 as illustrated includes a social network manager module 120 that is representative of functionality to implement and manage a content social network service. An example of this is an online social-media based portfolio service for content creators (e.g., Behance®) that is usable by consumers to locate content professionals through examples of content created by the professionals.

The environment 100 also includes a marketing and analytics service 108. The marketing and analytics service 108 includes a marketing manager module 122 that is representative of functionality involving creation and tracking of marketing campaigns and the analytics manager module 124 is representative of functionality to analyze "big data," e.g., posts from a social network service. For example, marketing activities may be utilized to increase awareness of a good or service. This includes making potential consumers aware of the good or service as well as making the potential consumers aware of characteristics of the good or service, even if the potential consumers already own the good or have purchased the service. An advertiser, for instance, generates a marketing activity to indicate functionality that is available from the good or service to increase usage and customer satisfaction.

Marketing activities take a variety of different forms, such as online marketing activities may involve use of banner ads, links, webpages, online videos, communications (e.g., emails, status posts, messaging), and so on that may be accessed via the Internet or otherwise. Marketing activities are also be configured for use that does not involve the Internet, such a physical fliers, television advertising, printed advertisements, billboard display (e.g., at a sporting event or along a side of a road), and so forth.

The marketing manager module 122 includes functionality to configure content 116 for inclusion as part of a marketing activity as well as track deployment of the content 116 as part of the marketing activity. The marketing manager module 122, for instance, may embed digital rights management functionality (e.g., a tracking monitor) to track the deployment of the content 116, e.g., to determine a number of times accessed by potentials customers, how and when accessed, identities of who accessed the content, and so forth as processed by the analytics manager module 124.

The client device 110 is illustrated as including a communication module 126 that is representative of functionality to access the content creation service 104, content sharing service 104, content social network service 106, marketing and analytics service 108, and/or content 116 (e.g., available at an online store) via the network 112. The communication module 126, for instance, may be configured as a browser, a web-enabled application, and so on. As such the client device 110 may be utilized by creative professionals to create the content 116, consumers of the content sharing service 104 to gain rights to use the content 116 (e.g., marketers), consume the content 116 (e.g., as part of viewing a marketing activity), and so forth. A variety of other arrangements of functionality represented by the entities of the environment 100 of FIG. 1 are also contemplated without departing from the spirit and scope thereof. Having now described an environment that is usable to implement the techniques described herein, examples of the usage based content search techniques are described in the following.

Figure 2:
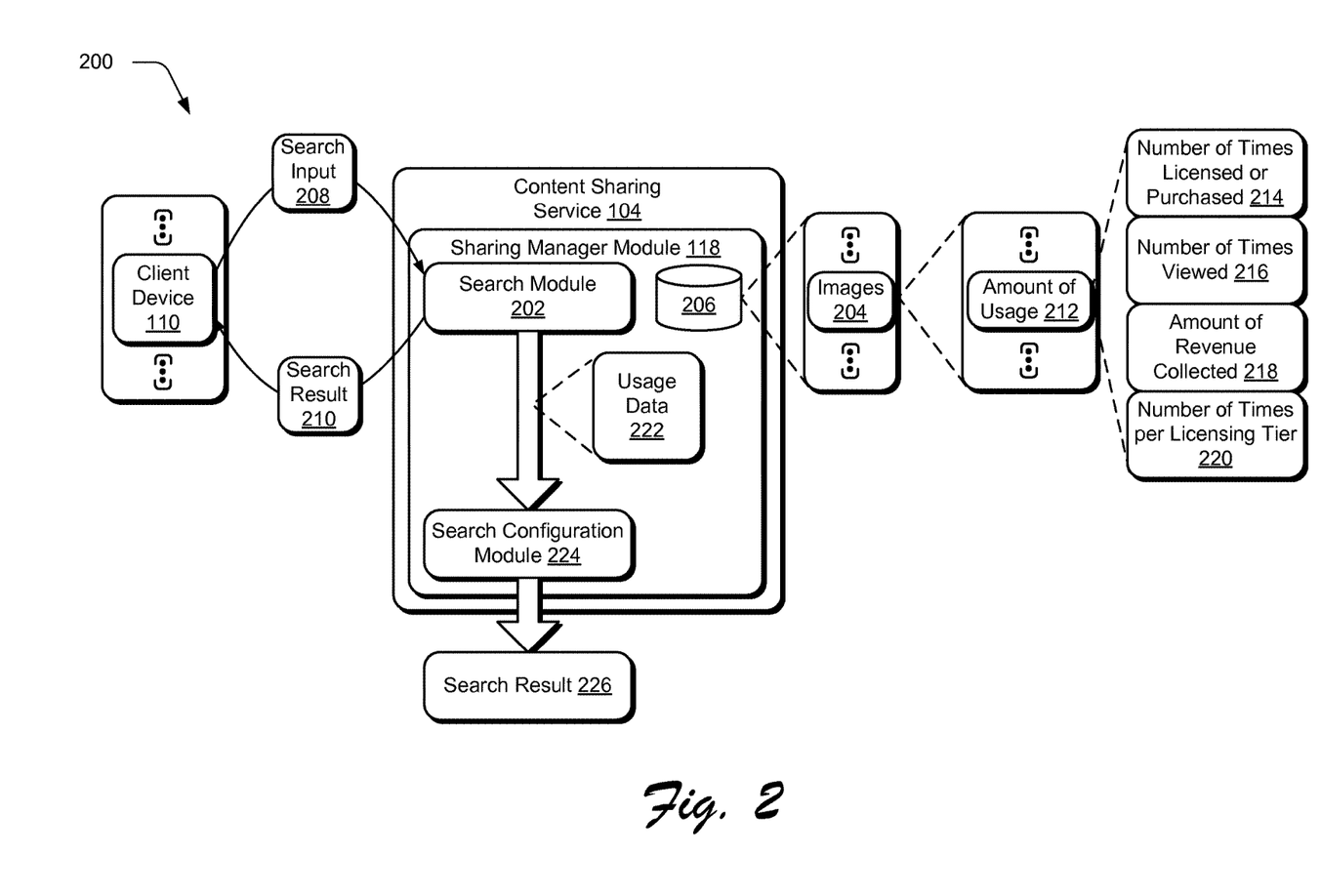
FIG. 2 depicts a system.
Figure 3:
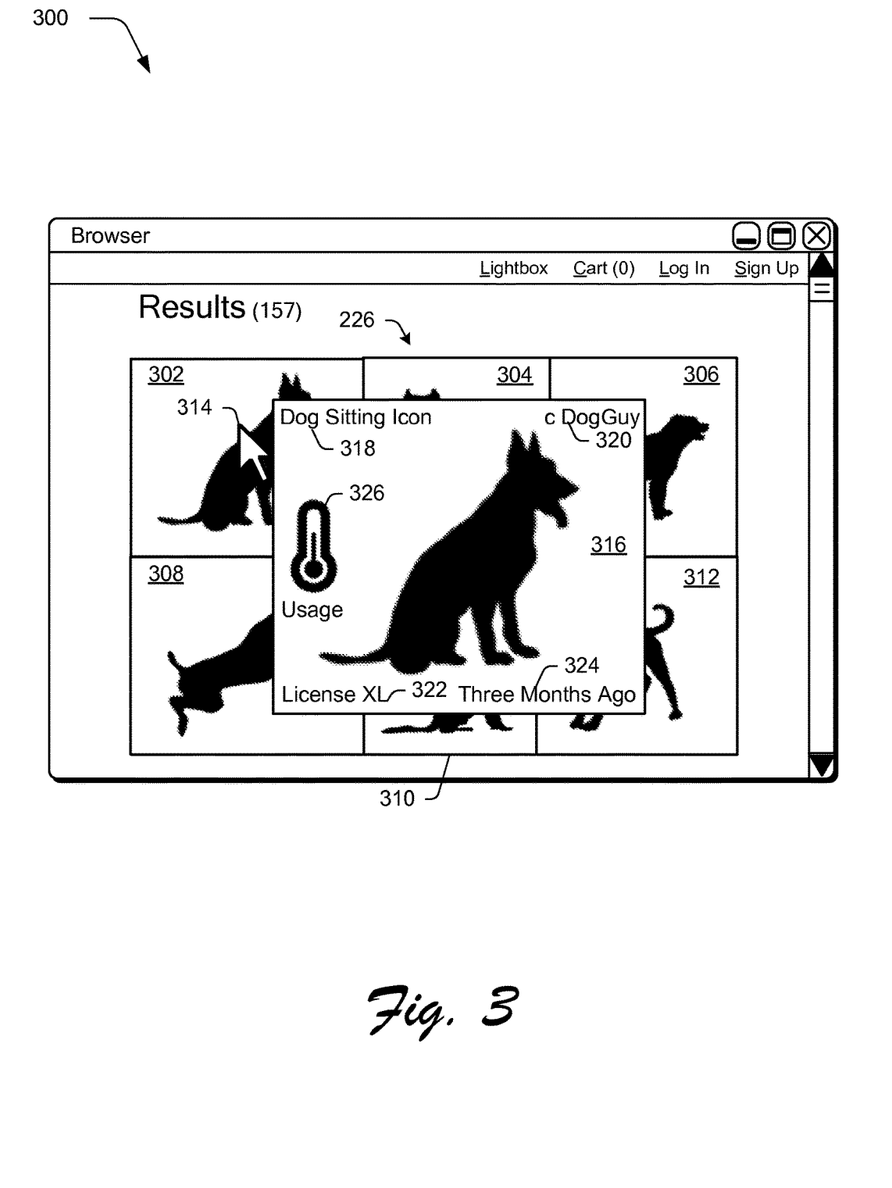
FIG. 3 depicts a user interface.
Figure 4:
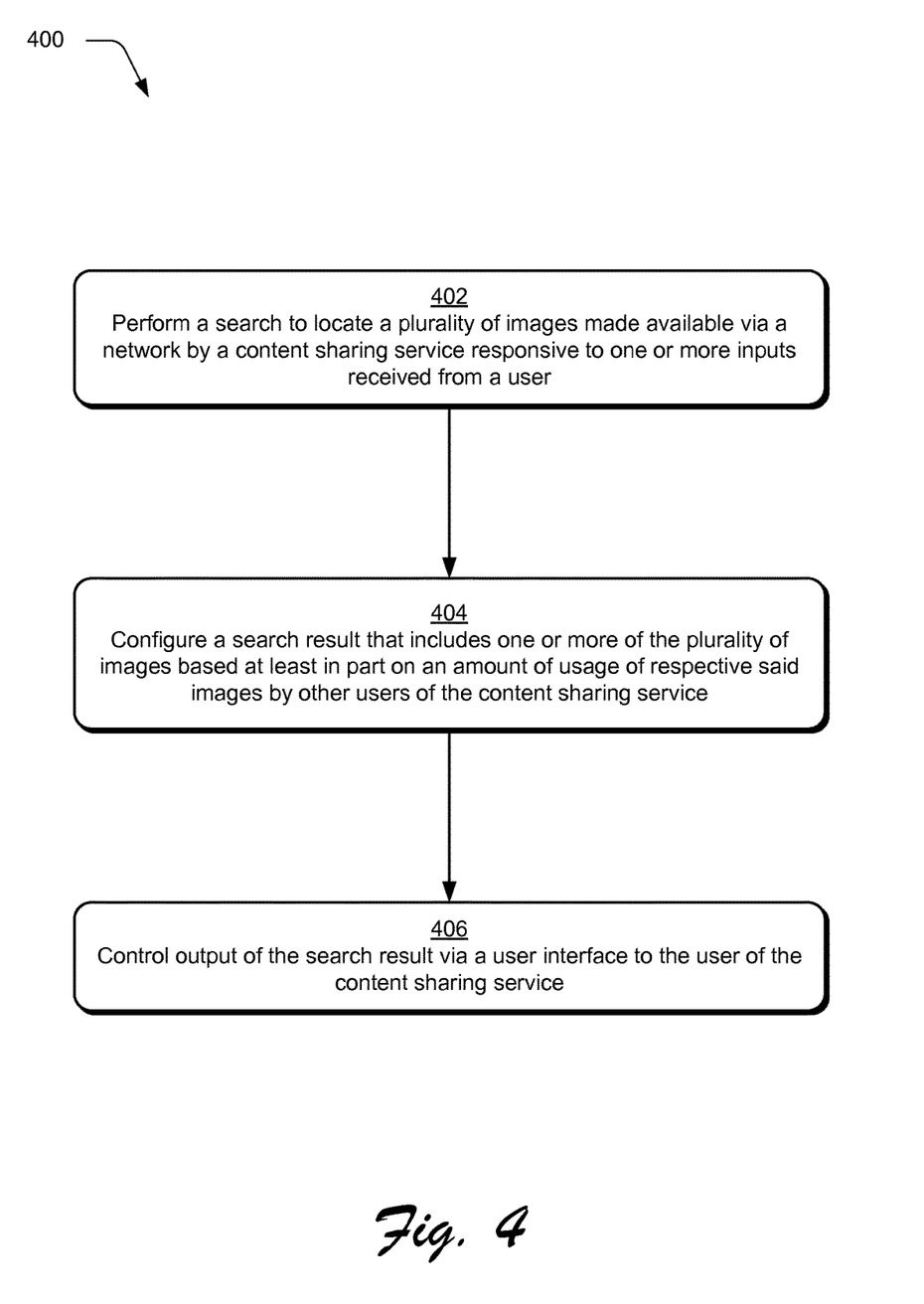
FIG. 4 depicts a procedure in an example implementation in which a search result is configured based at least in part on an amount of usage of respective images by other users of a content sharing service of FIG. 1.

FIG. 2 depicts a system 200, FIG. 3 depicts a user interface 300, and FIG. 4 depicts a procedure 400 in an example implementation in which a search result is configured based at least in part on an amount of usage of respective images by other users of a content sharing service 104. The content sharing service 104, for instance, may determine which images are actually obtained (e.g., licensed) by users and use this to provide "fresh" images to users of the service. In the following, reference is made interchangeably to FIGS. 2-4.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

Conventional techniques used to support searches for content are typically performed in a manner that mimics how webpages and other items are located, such as songs or applications as part of an application. As such, these conventional techniques do not address the unique considerations of content creation professionals that create this content nor of consumers of this content. For example, these conventional techniques may promote location of popular items and thus limit a user's ability to locate unique and "fresh" content, e.g., for use as part of a marketing campaign. Accordingly, the sharing manager module 118 in this instance is configured to employ techniques to configure searches that address an amount of usage of items included in the search.

The sharing manager module 118, for instance, is illustrated as including a search module 202. The search module 202 is representative of functionality to perform searches for images 204, which are illustrated as stored in storage 206 that may be local to or remote from the content sharing service 104. The images 204 as previously described are made available for purchase or licensing from the content sharing service 104, e.g., per item, subscription basis, and so on.

Accordingly, the search module 202 may receive a plurality of search inputs 208 (e.g., keywords, exemplars) from a plurality of client devices 110 and provide search results 210 to those devices. The search module 202, in addition to providing the search results 210, may monitor the searches and subsequent interaction to generate data that describes an amount of usage 212 of respective images 204. The amount of usage 212 may then be used as a basis to configure subsequent search results.

The amount of usage 212 is definable in a variety of ways. For example, the amount of usage 212 of respective images 204 may be based on a number of times the images 204 are licensed or purchased 214, e.g., from the content sharing service 104. In another example, the amount of usage 212 is defined as a number of times the images are viewed 216 via the content sharing service 104, e.g., provided in search results 210, included on a splash page of a website, and so forth.

In a further example, the amount of usage 212 of the images 204 is based on an amount of revenue collected 218 by the content sharing service 104 involving a purchase or licensing of the images 204. The content sharing service 104, for instance, may support a variety of pricing structures for images, such as licensing tiers involving macro, micro, or middle levels of exclusivity of usage. The images 204, for instance, may be made available as stock photos including macro-stock images that are generally high-priced and exclusive, micro-stock which is relatively low priced and made available to wide range of consumers, and mid-stock which is priced between the two. Accordingly, the amount of revenue collected 218 may reflect an exclusivity of intended use of the image. In another example, different amounts of revenue may be collected for commercial or editorial usage and thus the amount of revenue may also reflect this usage as a whole. A variety of other examples are also contemplated, such as based on a number of time per licensing tier 220 the images 204 are obtained.

Usage data 222 describing the amount of usage 212 is then provided by the search configuration module 224 to configure subsequent search results 226. For example, the search module 202 may perform a search to locate a plurality of images made available via a network by the content sharing service responsive to one or more inputs received from a user (block 402). A search result is configured that includes one or more of the plurality of images based at least in part on an amount of usage of respective images by other users of the content sharing service (block 404). This configuration may be performed in a variety of ways by the search configuration module 224.

Continuing with the previous examples, the search configuration module 224 is configurable to add or remove items (e.g., images 204) in a search result 226 based on the amount of usage 212 of the images 204. One or more images 204 exhibiting an amount of usage 212 that is above a threshold, for instance, may be removed from the search result 226 while images 204 exhibiting an amount of usage 212 that is below the threshold may be added to the search result 226. This may also be performed such that at least one of the images that exhibits this amount of usage remains such that "popular" images may remain. In one or more implementations, the addition and removal of items from the search result 226 is not performed based on usage for each of the items in the search result, but rather for a subset of the items to thereby expand a user's exposure to images 204 that would otherwise not be output and/or output at a ranking that is typically not accessed by users.

Further, this configuration may be performed regardless of how the amount of usage 212 is defined, such as to employ one or more of the number of times licensed or purchased 2124, number of times viewed 216, amount of revenue collected 218, number of times per obtained per licensing tier 220, and so on. Output of the search result is controlled via a user interface to the user of the content sharing service 104 (block 406). In this way, the search result 226 may be configured to support "fresh" images 204 that have an increased likelihood of being of interest to a user. The amount of usage 212 may be exposed to users in a variety of other ways, including inclusion of an indication of the amount of usage 212 along with a respective image 204, an example of which is described as follows and shown in a corresponding figure.

FIG. 3 depicts a user interface 300 that includes a search result 226 obtained from the content sharing service 104 of FIG. 2. The search result 226 in this instance includes image 302, 304, 306, 308, 310, 312 of dogs performed for inputs involving a keyword search for "dog icons" by the search module 202. A cursor 314 is illustrated as hovering (e.g., disposed over but not selecting via a "click") over image 302, which causes output of a preview 316 of the image 302 having additional information.

Illustrated examples of the additional information include a name 318 of the image 318, identification of a copyright holder 320 of the image 320, a type of license 322 and licensing tier (e.g., which of a plurality of hierarchical sizes and corresponding prices the image 302 is available for purchase or licensing), and a notification of an amount of time 324 the image 302 has been available via the content sharing service 104. In this way, a user may readily determine "how old" the image 302 is and react accordingly.

The preview 316 also includes an indication 326 of an amount of usage of the image 302. As before, the amount of usage 326 may describe one or more of the number of times licensed or purchased 214, number of times viewed 216, amount of revenue collected 218, number of times per obtained per licensing tier 220, and so on. Thus, a user may readily determine usage and corresponding uniqueness of an opportunity presented to purchase or license the image. A variety of other configurations of the user interface 300 are also contemplated.

Figure 5:
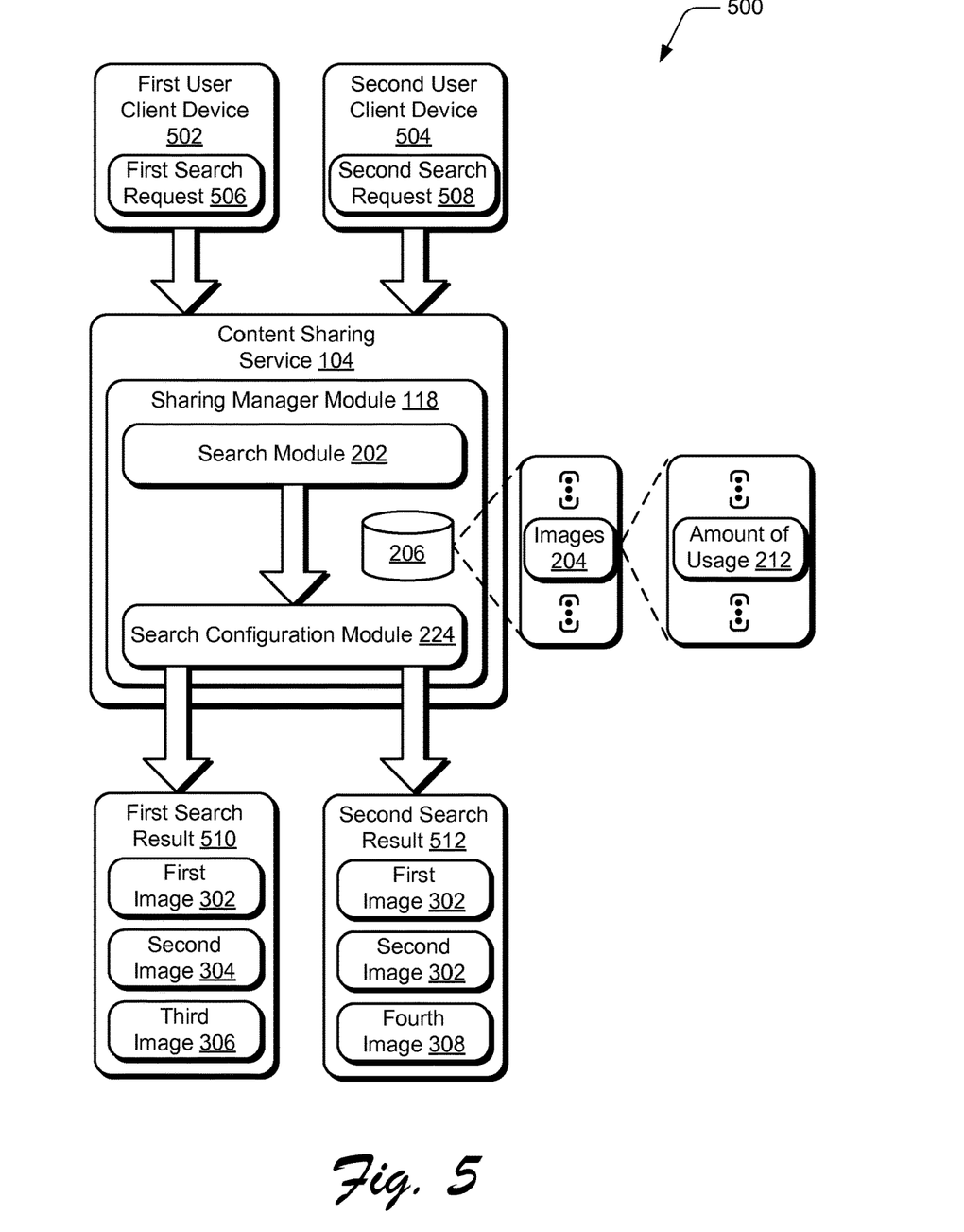
FIG. 5 depicts a system.
Figure 6:
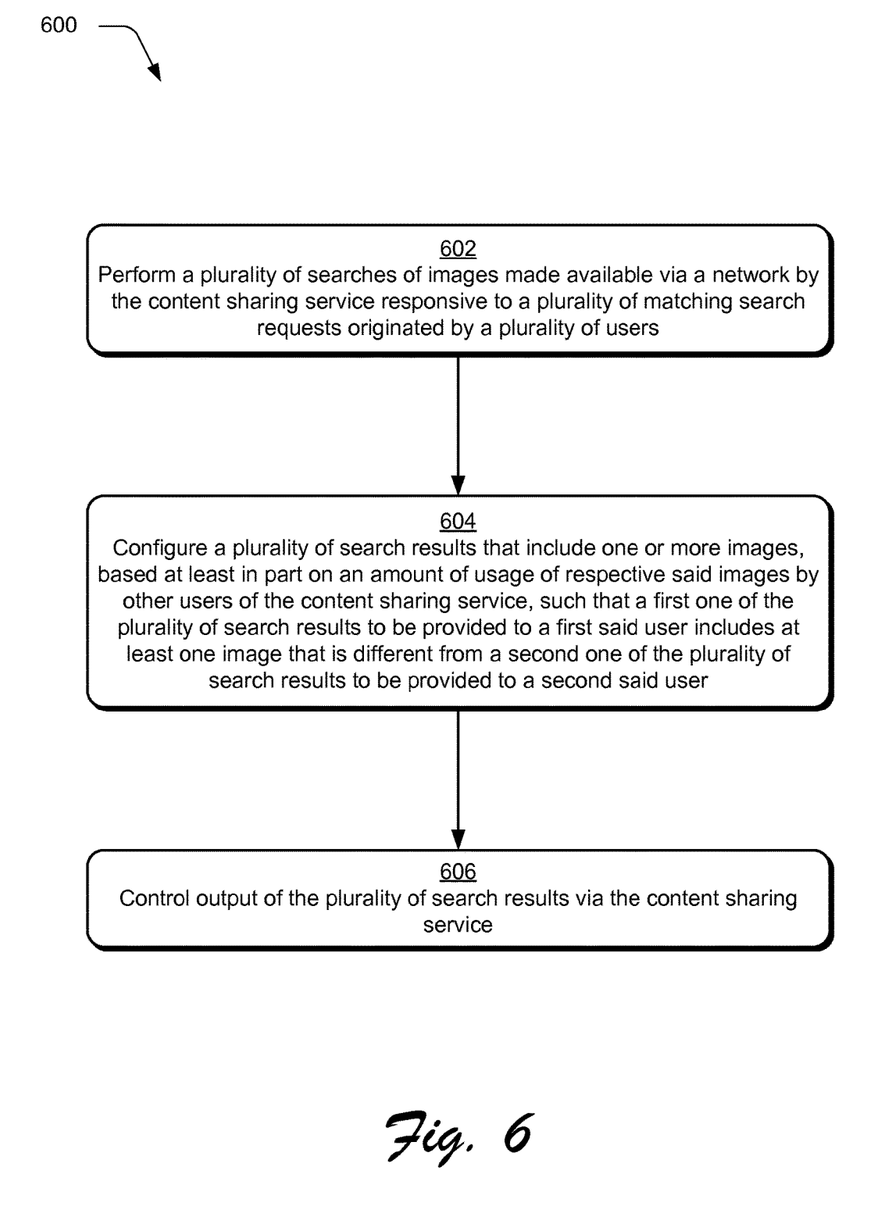
FIG. 6 depicts a procedure in an example implementation in which a search result is configured to promote freshness of items included in the result such that different search results are provided for matching search inputs.

FIG. 5 depicts a system 500 and FIG. 6 depicts a procedure 600 in an example implementation in which a search result is configured to promote freshness of items included in the result such that different search results are provided for matching search inputs. In the following, reference is made interchangeably to FIGS. 2-4.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

As previously described, conventional search techniques are configured to provide results that may run counter to desires by content creation professionals and consumers of content created by the professionals regarding "fresh" content by promoting popular content and limiting exposure. In this example, techniques are usable to promote freshness in the search results by varying items included in a search result even for matching search requests based on an amount of usage of the images as part of the content sharing service. This may be used to vary the images provided in search results even in instances in which the search requests match. In this way, exposure of a larger variety of images may be increased to a potentially larger group of consumers that promotes uniqueness of the images.

A plurality of searches are performed of images made available via a network by the content sharing service responsive to a plurality of matching search requests originated by a plurality of users (block 602). First and second users of first and second user client devices 502, 504, for instance, provide inputs to form respective first and second search requests 506, 508 that match. For example, the first search request 506 may include keywords that are to be matched to tags of images by the search monitoring module 202 that matches keywords included in the second search request. In another example, the first and second search requests 506, 508 reference images that are to be used as exemplars to find similar images, include matching objects within the images, and so on.

Accordingly, the search module 202 receives the first and second search requests 506, 508 and performs searches of the images 204 and the search configuration module 224 configures the searches for output. In this example, the plurality of search results are configured that include one or more images 204, based at least in part on an amount of usage 212 of respective images by other users of the content sharing service such that a first one of the plurality of search results 510 to be provided to a first one of the users includes at least one image that is different from a second one of the plurality of search results 512 to be provided to a second one of the users (block 604). As previously described, output is controlled of the plurality of search results via the content sharing service (block 606).

In the illustrated example, the first search result 510 includes first, second, and third images 302, 304, 306 whereas the second search results 512 includes first, second, and fourth images 302, 304, 308. Inclusion of which images are included in which search result is based on the amount of usage associated with the images. For example, the third image 306 may exhibit an amount of usage above a threshold amount and thus is removed as approaching a point at which the third image 306 may be overexposed. Thus, in the second search result 512 the third image 306 is replaced with a fourth image 308 that is not above this threshold amount or even is another image that is above this amount.

In this way, exposure of popular images may be normalized across a plurality of searches such that the first and second users are exposed to "fresh" items in the search results. As before, the amount of usage 212 is number of times licensed or purchased 214, number of times viewed 216, amount of revenue collected 218, number of times per obtained per licensing tier 220, and so on. In this way, a variety of definitions of the amount of usage 212 are usable to control inclusion of items in a search result, a ranking of those items within the search result, and so forth.

Figure 7:
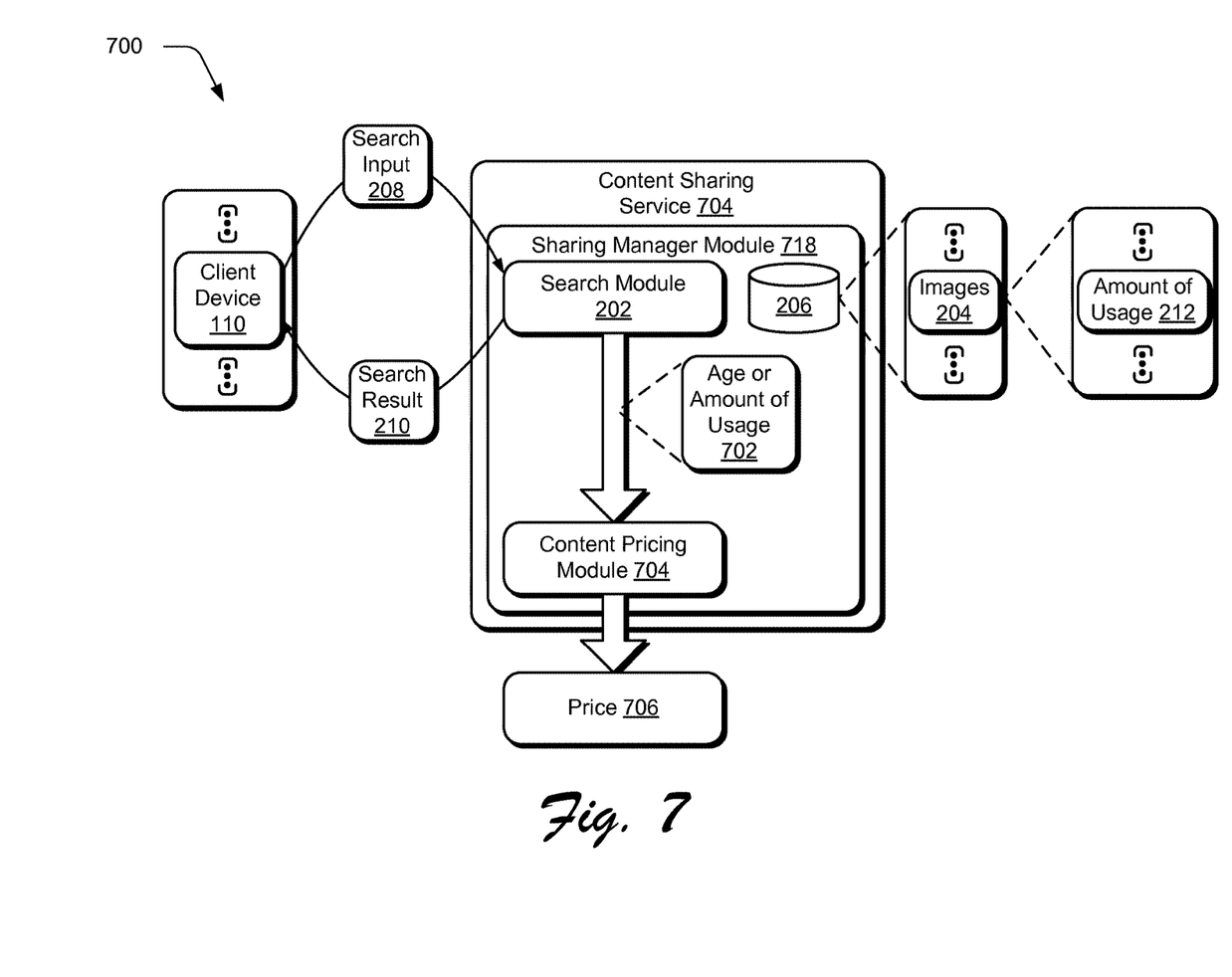
FIG. 7 depicts a system.
Figure 8:
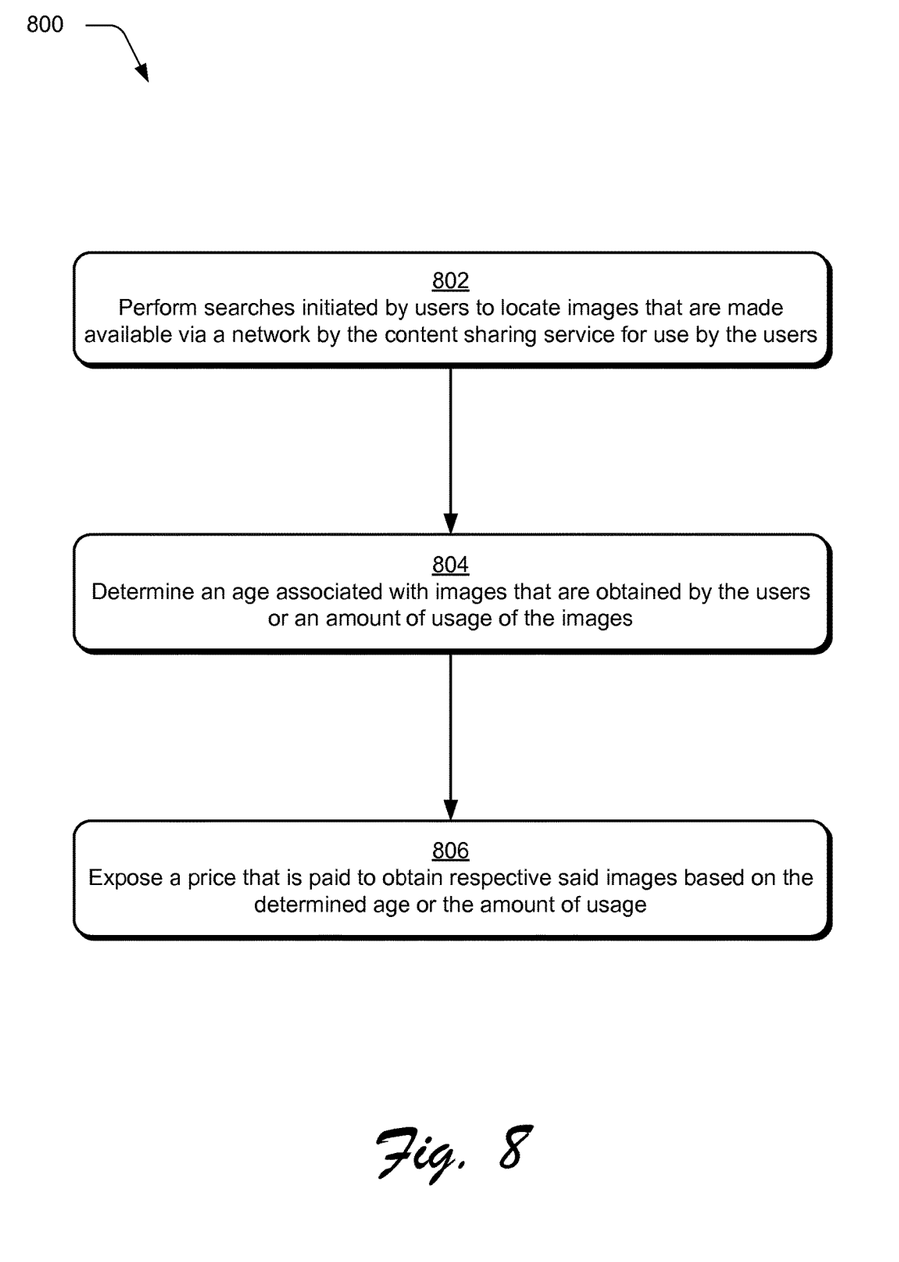
FIG. 8 depicts a procedure in an example implementation in which an amount of usage or age of content is used to determine and expose a price to purchase or license the item via the content sharing service of FIG. 1.

FIG. 7 depicts a system 700 and FIG. 8 depicts a procedure 800 in an example implementation in which an amount of usage or age of content is used to determine and expose a price to purchase or license the item via the content sharing service 104. In the following, reference is made interchangeably to FIGS. 7 and 8.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

As previously described, a freshness of content may have a direct correlation with a user's desire to purchase or license the content. For example, content exposed to and used by a multitude of consumers may have less interest to marketers than content that has not been overused. Accordingly, in this example the content sharing service 104 leverages a determination of the freshness of the content to determine and expose a price for purchase or licensing of the content.

The sharing manager module 118 is illustrated as including a search module 202 as described in relation to FIG. 2. The search module 202 is representative of functionality to perform searches for images 204, which are illustrated as stored in storage 206 that may be local to or remote from the content sharing service 104. The images 204 are made available for purchase or licensing from the content sharing service 104, e.g., per item, subscription basis, and so on.

Searches are performed that are initiated by users to locate images that are made available via a network by the content sharing service 104 for use by the users (block 802). For example, the search module 202 may receive a plurality of search inputs 208 (e.g., keywords, exemplars) from a plurality of client devices 110 and provide search results 210 to those devices.

An age or amount of usage of the images that are obtained by the users is determined (block 804). The search module 202, in addition to providing the search results 210, may monitor the searches and subsequent interaction to generate data that describes an amount of usage 212 of respective images 204. The amount of usage 212 is definable in a variety of ways. For example, the amount of usage 212 of respective images 204 may be based on a number of times the images 204 are licensed or purchased, a number of times the images are viewed, based on an amount of revenue collected by the content sharing service 104 involving a purchase or licensing of the images, a number of times obtained per licensing tier, and so forth. The search module 202 may also be configured to track an age of the images 204 that is defined based on how long respective images 204 have been available via the content sharing service 704, e.g., through use of a tag associated with the images 204.

The age or amount of usage 702 is then used by a content pricing module 704 to determine a price 706 for images 204, which is then exposed (block 806) for output via a user interface, e.g., as part of a search result. For example, the content pricing module 704 may determine that a relatively high price is to be set for images 204 that have an age that is considered new and a limited amount of usage, and decrease or increase that price based on subsequent amounts of usage 212.

Further, this may support stages defined by both the age and amount of usage to follow observations in how the images 204 are typically perceived. An image, for instance, may be initially perceived as deviant with limited value, but then is viewed as hip having increased perceived value, then hot which is a greatest perceived value, and then followed by stale with decreasing perceived value. Each of these stages thus includes a corresponding determination of price 706 by the content pricing module 704 based on the perceived values and thus accurately reflects market conditions. A variety of other pricing examples are also contemplated.

Example System and Device

Figure 9:
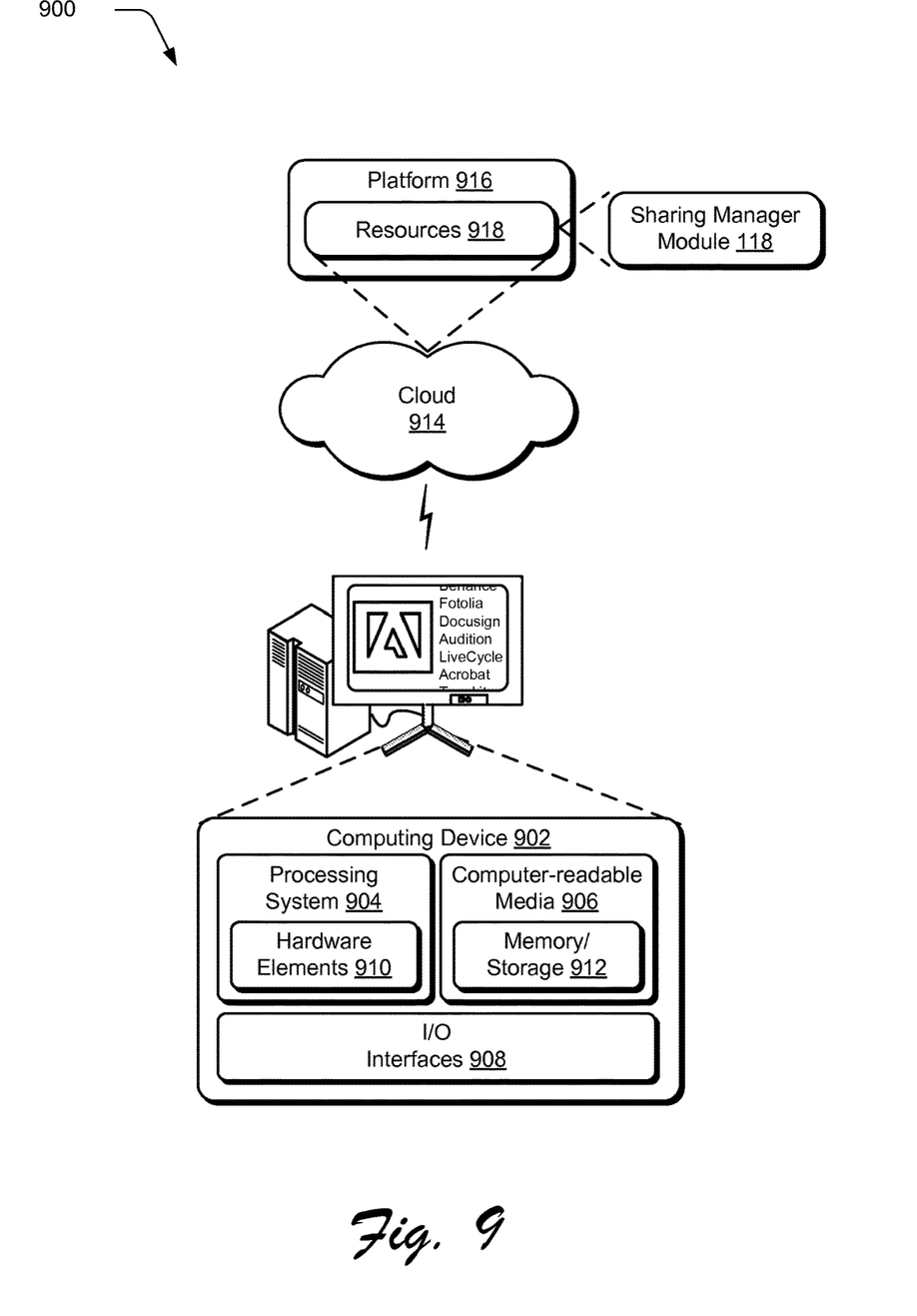
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the sharing manager module 118. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for controlling image searches and availability, a method implemented by one or more computing devices of a content sharing service comprising:

performing, by a search module executed by the one or more computing devices, a search to locate a plurality of images made available for licensing or purchase by the content sharing service and generate search result data based on the search, the search performed responsive to one or more inputs received from a user to a graphical user interface of the content sharing service;

monitoring, by the search module executed by the one or more computing devices, interactions with the plurality of images via the content sharing service, and generating usage data based on the interactions;

receiving, by a configuration module executed by the one or more computing devices, the search result data and the usage data communicated from the search module;

configuring, by the configuration module executed by the one or more computing devices, a search result based on the search result data and the usage data, the search result being configured to include at least some of the plurality of images based at least in part on an amount of usage of respective said images by:

generating, based on the usage data, data describing an amount of usage of respective said images by other users of the content sharing service;

removing one or more of the plurality of images from the search result that have the amount of usage that is above a threshold amount of usage; and keeping at least one image of the plurality of images in the search result that has the amount of usage that is above the threshold amount of usage;

configuring, by the one or more computing devices, the graphical user interface to display the images included in the search result based on the amount of usage, the search result configured to support user navigation, via the graphical user interface, through the images available for licensing or purchase from the content sharing service; and causing, by the one or more computing devices, a price for licensing use of at least one of the images included in the search result to be populated to the graphical user interface based on a request initiated via the graphical user interface.

2. A method as described in claim 1, wherein the configuring the search result is performed to normalize exposure of the plurality of images that are located as corresponding to the one or more inputs such that a first said search result includes at least one said image that is not included in a second said search result that is performed using matching said one or more inputs.

3. A method as described in claim 1, wherein configuring the graphical user interface includes providing an indication in the graphical user interface of an age associated with the images in the search result based on an amount of time since the images have been made available for license or purchase via the content sharing service.

4. A method as described in claim 1, wherein the amount of usage is based on one or more of:

a number of times a respective said image is licensed or purchased for use from the content sharing service; or an amount of revenue collected by the content sharing service to license or sell respective said images for use.

5. A method as described in claim 1, wherein the amount of usage is based on a number of times a respective said image is viewed via the content sharing service.

6. A method as described in claim 1, wherein the amount of usage is based on a number of times respective said images are obtained for use via respective ones of a plurality of licensing tiers of the content sharing service, each of the plurality of licensing tiers having a different associated monetary amount, one to another.

7. A method as described in claim 6, wherein the plurality of licensing tiers include commercial or editorial usage.

8. A method as described in claim 1, wherein said monitoring the interactions with the plurality of images comprises monitoring one or more of:

a number of times the images are licensed or purchased from the content sharing service; or a number of times the images are viewed via the content sharing service.

9. In a digital medium environment for controlling image searches and availability, a method implemented by one or more computing devices of a content sharing service comprising:

performing, by the one or more computing devices, a search to locate a plurality of images made available for licensing or purchase by the content sharing service and generate search result data based on the search, the search performed responsive to one or more inputs to a graphical user interface received from a user of the content sharing service;

monitoring, by the one or more computing devices, interactions with the plurality of images via the content sharing service, and generating usage data based on the interactions;

configuring, by the one or more computing devices, a search result based on the search result data and the usage data, the search result being configured to include at least some of the plurality of images based at least in part on an amount of usage of respective said images by:

generating, based on the usage data, data describing an amount of usage of respective said images by other users of the content sharing service;

removing one or more of the plurality of images from the search result that have the amount of usage that is above a threshold amount of usage; and adding one or more of the plurality of images to the search result that have the amount of usage that is below the threshold amount of usage; and configuring, by the one or more computing devices, the graphical user interface to display the images included in the search result based on the amount of usage, the search result configured to support user navigation, via the graphical user interface, through the images available for licensing or purchase from the content sharing service;

causing, by the one or more computing devices, a price for licensing use of at least one of the images included in the search result to be populated to the graphical user interface based on a request initiated via the graphical user interface.

10. A method as described in claim 9, wherein the configuring the search result is performed to normalize exposure of the plurality of images that are located as corresponding to the one or more inputs such that a first said search result includes at least one said image that is not included in a second said search result that is performed using matching said one or more inputs.

11. A method as described in claim 9, wherein the amount of usage is based on a number of times a respective said image is licensed or purchased for use from the content sharing service.

12. A method as described in claim 9, wherein the amount of usage is based on a number of times a respective said image is viewed via the content sharing service.

13. A method as described in claim 9, wherein the amount of usage is based on an amount of revenue collected by the content sharing service to license respective said images for use.

14. A method as described in claim 9, wherein the amount of usage is based on a number of times respective said images are obtained for use via respective ones of a plurality of licensing tiers of the content sharing service, each of the plurality of licensing tiers having a different associated monetary amount, one to another.

15. A method as described in claim 9, wherein said monitoring the interactions with the plurality of images comprises monitoring one or more of:

a number of times the images are licensed or purchased from the content sharing service; or a number of times the images are viewed via the content sharing service.

16. In a digital medium environment for controlling image searches and availability, a system comprising:

at least one processor;

memory having stored thereon computer-readable instructions that are executable by the at least one processor to implement a search module and a configuration module to perform operations comprising:

performing, by the search module, a search to locate a plurality of images made available via a network for licensing or purchase by a content sharing service and generate search result data based on the search, the search performed responsive to one or more inputs received from a user to a graphical user interface of the content sharing service;

monitoring, by the search module, interactions with the plurality of images via the content sharing service, and generating usage data based on the interactions;

configuring, by the configuration module, a search result based on the search result data and the usage data, the search result being configured to include at least some of the plurality of images based on an amount of usage of respective said images by:

generating, based on the usage data, data describing an amount of usage of respective said images by other users of the content sharing service;

removing one or more of the plurality of images from the search result that have the amount of usage that is above a threshold amount of usage; and keeping at least one image of the plurality of images in the search result that has the amount of usage that is above the threshold amount of usage;

configuring the graphical user interface to display the images included in the search result based on the amount of usage, the search result configured to support user navigation, via the graphical user interface, through the images available for licensing or purchase from the content sharing service; and causing a price for licensing use of at least one of the images included in the search result to be populated to the graphical user interface based on a request initiated via the graphical user interface.

17. The system as described in claim 16, wherein configuring the search result is effective to normalize exposure of the plurality of images that are located as corresponding to the one or more inputs such that a first said search result includes at least one said image that is not included in a second said search result that is performed using matching said one or more inputs.

18. The system as described in claim 16, wherein the amount of usage is based on one or more of:

a number of times a respective said image is licensed or purchased for use from the content sharing service; or an amount of revenue collected by the content sharing service to license or sell respective said images for use.

19. The system as described in claim 16, wherein the amount of usage is based on a number of times a respective said image is viewed via the content sharing service.

20. The system as described in claim 16, wherein the amount of usage is based on a number of times respective said images are obtained for use via respective ones of a plurality of licensing tiers of the content sharing service, each of the plurality of licensing tiers having a different associated monetary amount, one to another.

* * * * *